H. C. SOULE.
ELECTRICAL APPARATUS.
APPLICATION FILED AUG. 3, 1907.

921,018.

Patented May 11, 1909.
2 SHEETS—SHEET 2.

UNITED STATES PATENT OFFICE.

HERBERT C. SOULE, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL APPARATUS.

No. 921,018.     Specification of Letters Patent.     Patented May 11, 1909.

Application filed August 3, 1907. Serial No. 386,857.

*To all whom it may concern:*

Be it known that I, HERBERT C. SOULE, a citizen of the United States, and a resident of Wilkinsburg, in the county of Allegheny and State of Pennsylvania, have invented a new and useful Improvement in Electrical Apparatus, of which the following is a specification.

My invention relates to electrical apparatus and it has special reference to alternating current transformers which are adapted to be suspended under the bodies of electric railway vehicles.

The object of my invention is to provide means for supporting and insulating the transformer leads and a readily removable means for protecting the transformer core and windings.

Electric vehicles which are supplied with alternating current energy are usually equipped with transformers which serve to reduce the electromotive force of the line before it is applied to the vehicle motors.

According to my present invention, I provide a transformer of the aforesaid class which may be readily suspended from the body frame of an electric vehicle and one which is specially protected from injury.

Figure 1:
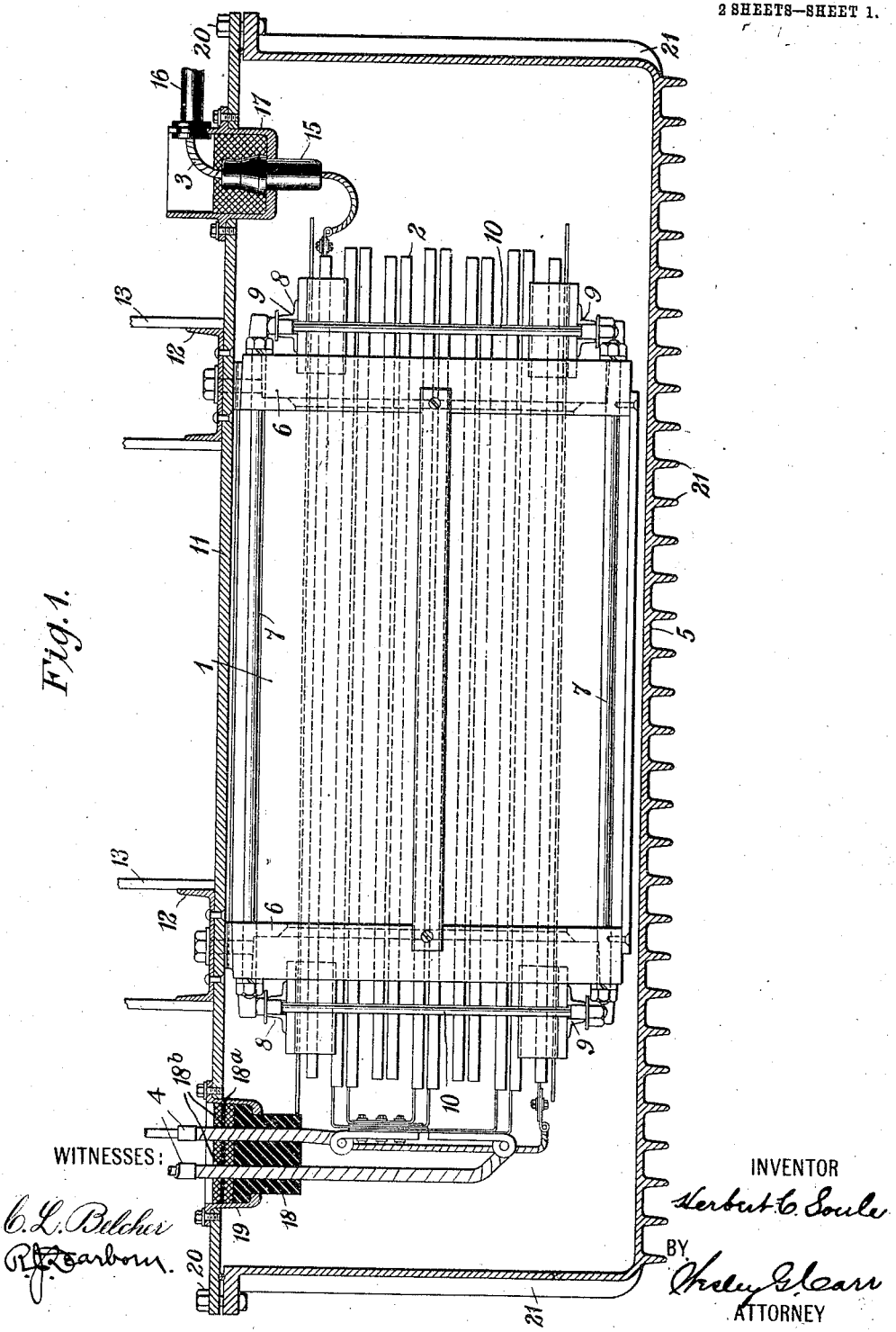
Figure 2:
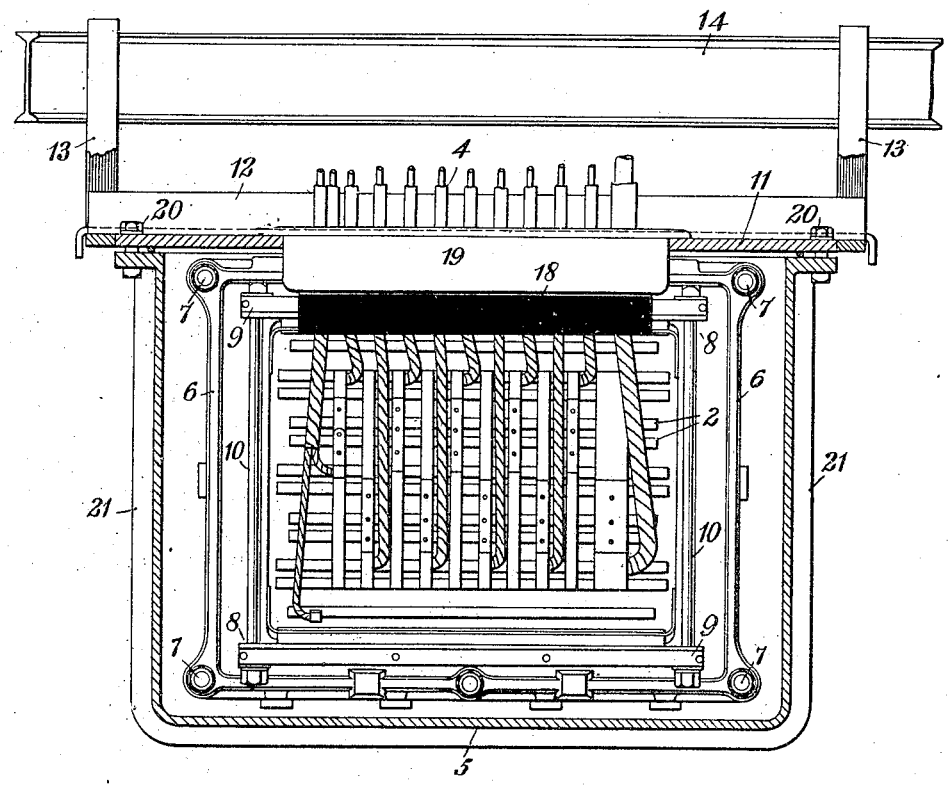

Figure 1, of the accompanying drawings, is a longitudinal elevation, and Fig. 2 is an end elevation of a transformer constructed in accordance with my invention, the inclosing casing being shown in section to disclose the core and windings.

Referring to the drawings, the transformer here illustrated comprises a laminated magnetizable core member 1, a winding 2, primary and secondary leads 3 and 4, and an inclosing casing 5 adapted to contain oil or other insulating fluid. The magnetizable core member is provided with end frames 6 that are clamped together by bolts 7. The extremities of the coils, of which the winding 2 is composed, are braced by coil supports 8. The supports 8 constitute the subject-matter of Patent No. 885,800, granted April 28, 1908, to Westinghouse Electric & Manufacturing Company, upon an application filed by me, and comprise a pair of opposite side strips 9 and clamping rods or bolts 10.

The transformer and a cover plate 11 are secured to channel beams 12 to which the end frames 6 are bolted, the channel beams 12 being suspended by suitable strips 13 from a beam 14 which forms part of the body frame of an electric car or other vehicle. Any suitable means may, of course, be employed for supporting the channel beams from the car body.

The high-voltage leads 3 are connected to one end of this transformer winding 2 and extend through insulating bushings 15 and 16 that are supported by a flanged cup 17 fitted into a suitable opening in the cover plate 11. The bushing 15 projects through the bottom of the cup 17, and the bushing 16 projects from one of its side walls at a point outside the transformer casing.

The low-voltage leads 4 also, extend through an insulating bushing 18, corresponding to the bushing 15 and supported by a cup 19 which is fitted into a suitable opening in the cover plate 11. After the leads are in position, the cups 17 and 19 are partially filled with a liquid insulating compound, which becomes solid at ordinary temperatures and serves to seal the openings around the leads and around the bushings. A plate 18$^a$ of hard insulating material, such as fiber, is fitted into the cup 19 on top of the first layer of insulating compound and is provided with holes 18$^b$ through which the leads are threaded. The cup is then provided with another layer of insulating compound. The stiff fiber washer prevents any movement of the leads which would tend to separate them from the compound in case the latter were softened by high temperatures and, in this way, the inner layer of the compound is able to more effectually and permanently seal the leads into the bushings through which they extend.

The casing 5 is adjustably secured to the plate 11 by a plurality of bolts 20 and its outer surface is provided with ribs or corrugations 21 in order to improve its heat-radiating properties.

It will, of course, be understood that the method of securing the cover plate 11 to an overhead wall or structure may be varied materially without departing from the spirit of my invention and will be dependent upon existing conditions. It is conceivable that various other modifications in the size and the arrangement of details may be effected within the scope of my invention.

I claim as my invention:

1. In a transformer, the combination with a magnetizable core member, a winding and means for suspending the core member from an overhead support, of a removable fluid-containing casing for the transformer.

2. In a transformer, the combination with a magnetizable core member, a winding, a cover plate and beams from which the core member is suspended and to which the cover plate is attached, of insulating bushings secured to the plate through which the transformer leads extend, and a casing for the transformer removably attached to the cover plate.

3. In a transformer, the combination with a magnetizable core member and a winding, cross beams from which the core member is suspended, a cover plate attached thereto and insulating bushings secured to the plate through which the transformer leads extend, of an inclosing casing for the transformer removably secured to the cover plate and having a ribbed or corrugated external surface.

4. In a transformer, the combination with a magnetizable core member and a winding, cross beams from which the core member is suspended, a cover plate attached thereto, flanged cups secured to the supporting plate and insulating bushings seated in openings in the bottoms of the cups through which the transformer leads extend, of an inclosing casing for the transformer removably attached to the cover plate and having a ribbed or corrugated external surface.

5. In a transformer, the combination with a magnetizable core member and a winding, cross beams from which the core member is suspended, a cover plate attached to the beams, and flanged cups or sleeves secured to the plate, of means for insulating the transformer leads from the cups or sleeves and securing them thereto, and an inclosing casing for the transformer removably secured to the cover plate and having a ribbed or corrugated external surface.

6. The combination with a bushing for electric leads and a cup in which the bushing is disposed, of alternate layers of molded insulation to seal the leads, and hard insulating washers to hold them firmly in position.

7. The combination with a bushing for electric leads, and a flanged cup in which the bushing is supported, of a stiffening and supporting plate through which the leads are threaded, and a molded or cast insulating compound disposed in the cup on both sides of the plate for the purpose of sealing the leads in place.

8. The combination with a supporting structure, of a transformer and a cover plate that are secured directly to the supporting structure, and a casing for the transformer removably attached to the cover plate.

9. The combination with a supporting structure, of a transformer and a casing therefor that are independently suspended from the supporting structure.

In testimony whereof, I have hereunto subscribed my name this 30th day of July, 1907.

HERBERT C. SOULE.

Witnesses:
OTTO S. SCHAIRER,
BIRNEY HINES.